(12) United States Patent
Hirashima

(10) Patent No.: US 7,755,227 B2
(45) Date of Patent: Jul. 13, 2010

(54) VIBRATION GENERATOR

(75) Inventor: Hiroki Hirashima, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 835 days.

(21) Appl. No.: 11/538,494

(22) Filed: Oct. 4, 2006

(65) Prior Publication Data
US 2007/0085425 A1 Apr. 19, 2007

(30) Foreign Application Priority Data

Oct. 19, 2005 (JP) .............................. 2005-305029
Nov. 10, 2005 (JP) .............................. 2005-326533

(51) Int. Cl.
*H02K 33/00* (2006.01)
(52) U.S. Cl. ......................................... 310/36; 310/81
(58) Field of Classification Search .................. 310/36, 310/81, 15, 21, 32
See application file for complete search history.

(56) References Cited

U.S. PATENT DOCUMENTS 6,404,085 B2 * 6/2002 Hamaguchi et al. ........... 310/81
6,590,991 B1 * 7/2003 Maeda ........................ 381/409
6,720,691 B2 * 4/2004 Yoneyama et al. ............ 310/81
2007/0216235 A1 * 9/2007 Lee .............................. 310/36

FOREIGN PATENT DOCUMENTS

JP      10-277265      10/1998
JP      2005-095740    4/2005

* cited by examiner

*Primary Examiner*—Nguyen N Hanh
(74) *Attorney, Agent, or Firm*—Brinks Hofer Gilson & Lione

(57) ABSTRACT

A vibration generator is provided. The vibration generator comprising a case having a hollow inside and a lower plate. A first vibrator is disposed away from the lower plate of the case and supported by first elastic member fixed to the lower plate. A second vibrator is disposed away from the first vibrator and supported by second elastic member fixed to the first vibrator. The first vibrator and the second vibrator are operable to vibrate separately. When operated separately at least two different resonance frequencies are created and transmitted to the case.

9 Claims, 6 Drawing Sheets

*FIG. 10* RELATED ART
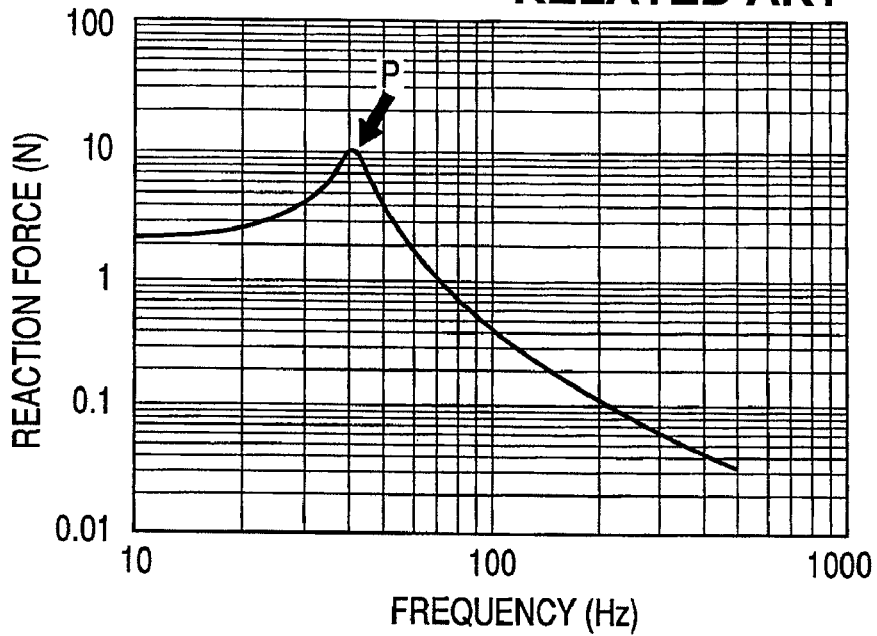
*FIG. 11* RELATED ART
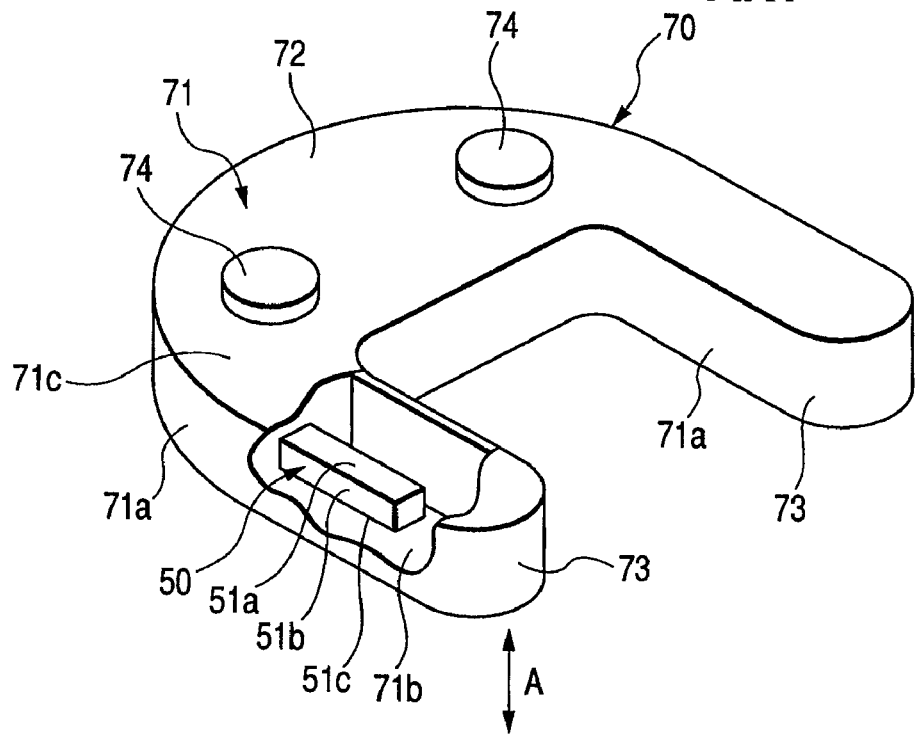

VIBRATION GENERATOR

This patent document claims the benefit of Japanese Patent Application Number 2005-305029 filed on Oct. 19, 2005 and Japanese Patent Application Number 2005-326533 filed on Nov. 10, 2005, which are hereby incorporated by reference.

BACKGROUND

1. Field

The present embodiments relate to a vibration generator.

2. Related Art

In the related art, a vibration generator that is mounted in a case, for example, of a controller of a game machine and transmits a vibration to an operator is disclosed in, for example, JP-A-2005-95740, which is described hereinafter with reference to FIGS. 9A and 9B.

In a vibration generator 50 disclosed in JP-A-2005-95740, an elastic member 52 of leaf spring is mounted at an upper plate 51a of a case 51 and supported by a fixing portion 52a of one end only, which is fixed at the upper plate 51a and a connecting portion 54 of the other end is fixed to a moving body 53 by adhesion.

A weight 58 and coils 55 are fixed onto the lower surface of the moving body 53. Magnets 56 are mounted along the side walls 51b of the case 51. A yoke 57 faces the magnets in the case 51.

In FIG. 9A, electric current does not flow in the coils 55, which are disposed between the yoke 57 and the magnet 56. A magnetic flux generated from the magnet 56 perpendicularly travels across the coil 55 to the yoke 57.

However, when electric current unidirectionally flows into the coil 55, an electromagnetic force is induced in the Z direction by the magnetic flux and electric current, which can drive the moving body 53 in the Z direction.

A switch 59 having a fixing contact and a driving contact 59b is mounted by the side of the moving body 53, and the fixing contact 59a is fixed onto a pedestal 60 and connected with one end of the coil 55 through a wire 61. The driving contact 59b is connected with a pulse generating circuit 63 (current supplying circuit) through a wire 62 and the pulse generating circuit 63 is connected with the other end of the coil 55.

In FIG. 9A, the switch 59 is in connection, in this embodiment when a signal is inputted from an input unit 64, electric current flows into the coil at the same time with the generation of a pulse voltage in a pulse generating circuit 63. As unidirectional electric current flows into the coil 55, an electromagnetic force F is induced in the Z direction by the magnetic flux and electric current, so that the moving body 53 moves in the Z direction. Due to the movement of the moving body 53, the driving contact 59b is pressed down in the Z direction, thereby maintaining the connection of the switch 59.

Alternatively, when electric current stops flowing by change in the pulse voltage generated in the pulse generating circuit 63, the electromagnetic force does not activate and the moving body 53 is moved in the opposite direction to the Z direction by the elastic force of the elastic member 52, thereby disconnecting the fixing contact 59a and driving contact 59b of the switch 59. When the switch 59 is in disconnection, a pulse voltage is generated in the pulse generating circuit 63 and electric current starts flowing to the coil 55 at the same time with the generation of pulse voltage, and an electromagnetic force F is induced in the Z direction and the moving body 53 moves in the Z direction. By repeating the above operations, in the vibration of the vibration generator 50, a resonance point P of resonance frequency appears, for example, near 40 Hz frequency as shown in FIG. 10, and the magnitude of the vibration is outputted as about 10 N.

The vibration of about 10 N outputted at the resonance point P creates a click vibration, which is sensible by an operator.

The vibration generator 50 may also be used as an acceleration sensor in which an electromotive force is induced at the coil 55 resulting from a vibration of the moving body 53 by a vibration applied to the case 51 from the outside when electric current does not flow into the coil 55.

An input/output device 70 utilizing the known vibration generator 50 is described hereinafter with reference to a controller, for example, of a game machine as shown in FIG. 11. The input/output device 70 for a game machine includes a case 71, which is composed of a base 72 and a pair of grips 73 extending in the same direction from the left and right side of the base 72, respectively, and can be gripped by an operator.

The base 72 and grips 73 are formed by a peripheral wall 71a, lower wall 71b, and an upper wall 71c and the inside of the input/output device 70 is hollow. A pair of switches 74 that is operated by an operator with fingers is provided on the upper wall 71c of the base 72.

The vibration generator 50 is mounted on the lower wall 71b in the grip 73 (the left one in the figure). The lower plate 51c of the vibration generator 50 is fixed onto the lower wall 71b of the grip 73 by adhesives such that the vibrator 53 can vibrate vertically, for example, in the direction of arrow A.

According to this configuration, as electric current flows into the coil 55 and the vibrator 53 vertically vibrates, the vibration is transmitted to the grip 73 and the left side and the grip 73 also vibrates vertically, for example, in the direction of arrow A.

In this embodiment, an operator senses the vibration through his/her left hand.

According to the above-mentioned known vibration generator 50, although a resonance point P of resonance frequency appears at a low frequency, for example, near 40 Hz as shown in FIG. 10 and a large vibration can be outputted at the resonance point P, as the frequency becomes far away from the resonance point P (that is, the vibrator vibrates at a high frequency), outputted vibrations become weak. Accordingly, the operator has difficulty sensing the vibrations at high frequencies.

In these embodiments, an electromotive force, when electric current does not flow, is large only within a narrow band near the resonance point P and weakened toward high frequencies, and thus the known vibration generator can not be used as an accelerator sensor. Accordingly, a vibration generator that generates large vibration in a wide range of frequency including at least two different resonance frequencies and generates a strong electromotive force in a wide frequency band using large vibrations in a wide range of frequency band including at least two resonance frequencies is desired.

SUMMARY

In one embodiment, A vibration generator includes a case having a hollow inside and a lower plate. A first vibrator is disposed at a predetermined distance from the lower plate of the case and supported by first elastic members fixed onto the lower plate. A second vibrator is disposed at a predetermined distance from the first vibrator and supported by second elastic members fixed onto the first vibrator. The first elastic members and at least the second elastic members respectively have a constant of spring different from each other and the first vibrator and at least the second vibrator are capable of separately vibrating. The first and at least the second vibrators separately vibrate, vibrations having at least two different resonance frequencies are generated and transmitted to the case.

According to one embodiment, the resonance frequency of the first vibrator is smaller than that of the second vibrator by setting the constant of spring of the first elastic member smaller than that of the second elastic member.

According to one embodiment, the second vibrator has a bar-shaped core of magnetic material and a coil wound around the core. Magnets are fixed at positions where the magnets respectively face both ends of the core through a predetermined space, magnetic field, which is generated in the coil when electric current flows into the coil, influences magnetic field of the magnets. The first vibrator and at least the second vibrator separately vibrate. The vibration of the vibrators are transmitted to the case through the first elastic members.

According to one embodiment, the first vibrator has a lower wall of which the lower surface is supported by the first elastic members and the upper surface is supported by the second elastic members and a pair of yokes of magnetic material disposed at the end of the lower wall and facing each other. The magnets are fixed to the pair of yokes, respectively.

According to one embodiment, the magnets fixed to the first vibrator are disposed such that the different magnetic poles vertically face each other and the magnets face the ends of the core, protrusions are formed at the ends of the core to protrude toward the magnet so as to reduce the cross-sectional area of the core facing the magnet.

According to another embodiment, the magnets are disposed such that the different magnetic poles face each other. A recess is formed at the interface of the different magnetic poles. The core is arranged such that the end thereof faces the recess.

According to one embodiment, the first and second elastic members are formed of a leaf spring. One end of the first elastic member is fixed to the lower plate of the case and the other end is fixed to the lower wall of the first vibrator. One end of the second elastic member is fixed to the lower wall of the first vibrator and the other end is fixed to the second vibrator.

An input/output device according to one embodiment, includes two grips, in which a vibration generator is mounted in one grip such that each of the first vibrator and at least the second vibrator is capable of vibrating toward the other grip.

According to another embodiment, a weight having a predetermined weight is mounted in the other grip and maintains the balance between the grips.

According to another embodiment, a control unit detects the electromotive force induced in the coil when electric current does not flow into the coil is mounted and outputs a control signal corresponding to the magnitude and the frequency of the electromotive force to be detected.

A vibration generator of one embodiment includes a case having an upper plate and a lower plate facing each other. A first vibrator disposed at a predetermined distance from the lower plate of the case and supported by first elastic members fixed onto the lower plate. At least a second vibrator suspended at a predetermined distance from the upper plate through at least second elastic members. The first elastic member and at least the second elastic member respectively have a different constant of spring and the first vibrator and at least the second vibrator separately vibrate. When the first vibrator and at least the second vibrator separately vibrate, vibrations having at least two resonance frequencies are generated and transmitted to the case.

According to another embodiment, at least the second vibrator has a coil wound around a bar-shaped core of magnetic material. A pair of magnets is fixed at positions where the magnets respectively face both ends of the case at a predetermined space, magnetic field, which is generated in the coil when electric current flows into the coil, influences magnetic field of the magnets. The first vibrator and at least the second vibrator separately vibrate. The vibration of the first vibrator is transmitted to the case through the first elastic members and the vibration of at least the second vibrator is also transmitted to the case.

BRIEF DESCRIPTION OF THE DRAWINGS

FIG. 10 is a view illustrating resonance frequencies generated by a known vibration generator; and FIG. 11 is a perspective view of a known input/output device.

DETAILED DESCRIPTION

Exemplary embodiments of a vibration generator of the invention will now be described with reference to the accompanying drawings.

Figure 1:
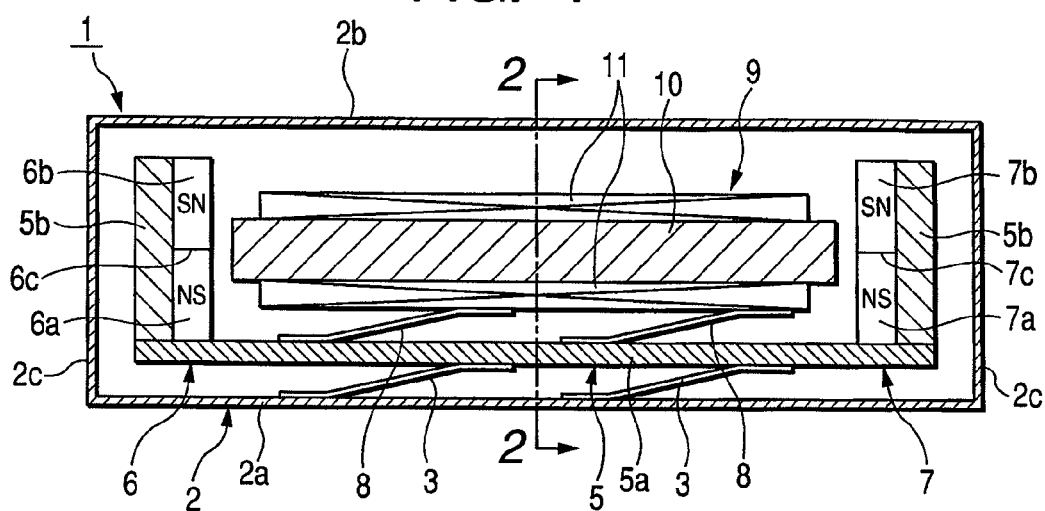
FIG. 1 is a cross-sectional view of main parts of a vibration generator according to a first exemplary embodiment.

A vibration generator 1 according to a first embodiment of the invention will now be described with reference to FIG. 1. The contour of the vibration generator 1 is formed of a case 2 that is composed of a lower plate 2a and an upper plate 2b that faces each other and a pair of side walls 2c. For example, the inside of the case 2 is hollow.

Each end (the right side in the figure) of a pair of first elastic members 3 of a leaf spring with a predetermined constant of spring is fixed to the inside of the lower plate 2a, for example, by adhesives.

The other ends (the left side in the figure) of the first elastic members 3 are free ends and bent to be spaced upward at a predetermined distance from the lower plate 2a. A first vibrator 5 is fixed to the free ends of the first elastic members 3 and supported by them, and capable of vibrating up and down.

In other words, the first vibrator 5 is stacked on the first elastic members 3 such that it is spaced at a predetermined distance from the lower plate 2a of the case 2 and supported by them.

The first vibrator 5 has a horizontally long lower wall 5a and a pair of yokes 5b that are formed of a magnetic material and face each other at both left and right ends of the lower wall 5a.

A first magnetic field generating part 6 is provided at the left end of the first vibrator 5 and a second magnetic field generating part 7 is provided at the right end.

A lower magnet 6a and an upper magnet 6b stacked on the lower magnet 6a are provided at the first magnetic field generating part 6 at the left end and fixed to the yoke 5b of the vibrator 5, for example, by adhesives. As shown in FIG. 1, the facing portion of the lower and upper magnets 6a and 6b is an interface 6c.

A lower magnet 7a and an upper magnet 7b stacked on the lower magnet 7b are provided at the second magnetic field generating part 7 at the right end and fixed to the right yoke 5b by adhesives, etc.

The facing portion of the lower and upper magnets 7a and 7b is an interface 7c.

A pair of second elastic members 8 of leaf spring is disposed on the lower wall 5a of the first vibrator 5 and the constant of spring of the second elastic members 2 is smaller than that of the first elastic member 3.

Each end (the right side in the drawing) of the second elastic members 8 is fixed to the lower wall 5a of the first vibrator 5, for example, by adhesive. The other ends (the left side) are free ends and bent to be spaced upward at a predetermined distance from the lower wall 5a. A second vibrator 9 is fixed to the free ends of the second elastic members 8 and supported by them, and capable of vibrating up and down.

For example, the second vibrator 9 is stacked on the second elastic members 8 such that it is spaced at a predetermined distance from the first vibrator 5, and supported by them.

In one embodiment, the second vibrator 9 is disposed between the first and second magnetic field generating parts 6 and 7 and composed of a horizontally long bar-shaped core 10 of magnetic material and a coil 11 wound around a bobbin (not shown) surrounding around the circumference of the core 10.

Both left and right ends of the core 10 of the second vibrator 9 respectively face the magnets 6a and 6b, and 7a and 7b fixed to the yoke 5b of the first vibrator 5 through predetermined-sized gaps. The bending height of the second elastic members 8 is adjusted such that the center of both ends of the core 10 and each interface 6c and 7c of the magnets are arranged on the same line in the initial state before electric current flows into the coil 11 of the second vibrator 9.

Figure 2:
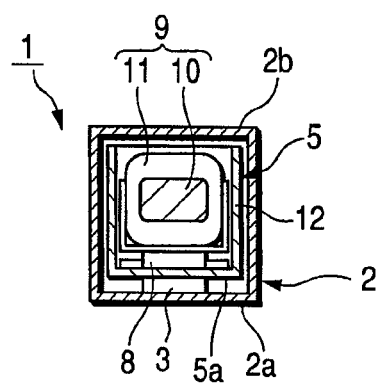
FIG. 2 is a cross-sectional view taken along the line 2-2 of FIG. 1.

As shown in FIG. 2, the second vibrator 9 is retained in a U-shaped retaining member 12, which is supported by the free end of the second elastic member 8, so that the second vibrator 9 can vibrate up and down.

The operation of the vibration generator 1 according to the first embodiment, configured as described above, will now be described hereinafter. In the initial state in which the centers of both left and right ends of the core 10 and the interfaces 6c and 7c of each magnet are arranged on the same line, when a voltage is applied to the coil 11 of the second vibrator 9, magnetic flux is generated in the core 10 and influences each magnetic field of the magnets 6a and 6b, and 7a and 7b.

Action and reaction forces opposite to each other are generated between each of the magnets 6a and 6b, and 7a and 7b and the core 10, so that the first vibrator 5 and the second vibrator 9 vibrate in the opposite direction to each other.

Figure 7:
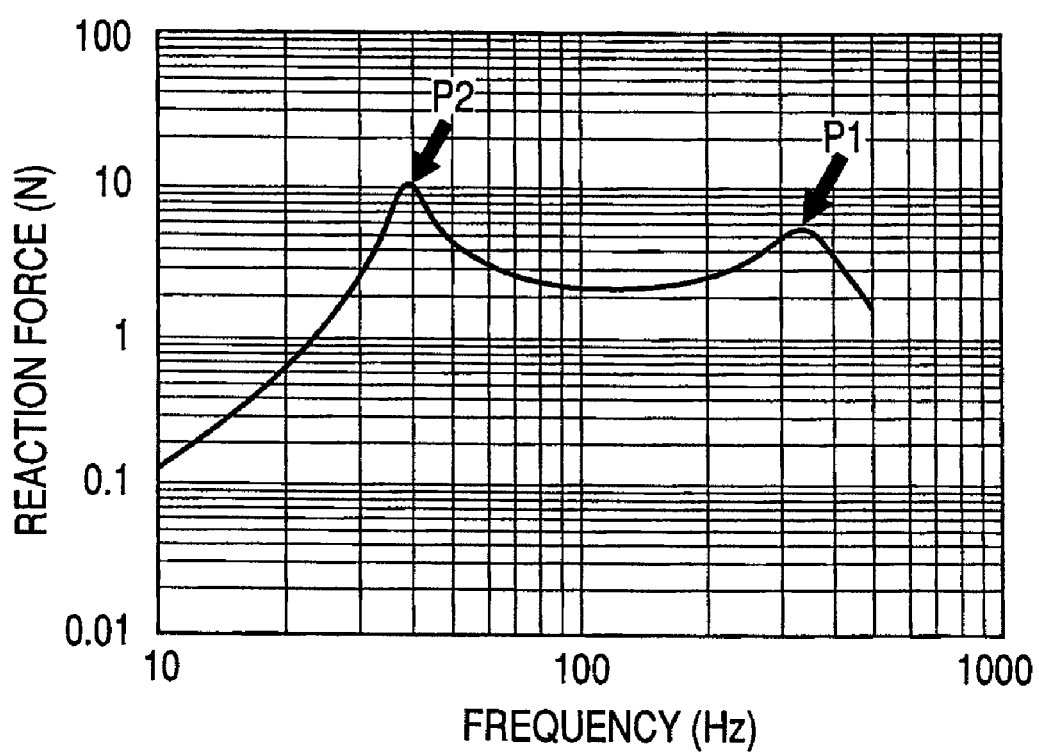
FIG. 7 is a view illustrating the frequency characteristic of a vibration generator.

As shown in FIG. 7, as the first vibrator 5 vibrates, a first resonance point P1 of a resonance frequency appears at a high frequency, for example, near 300 Hz. A large vibration of about 6 N can be outputted at the first resonance point P1.

As the second vibrator 9 simultaneously vibrates with the first vibrator 5, a second resonance point P2 of a resonance frequency appears at a low frequency, for example, near 38 Hz. A large vibration of about 10 N can be outputted at the second resonance point P2.

According to the vibration generator 1, although the frequency of a vibration increases, the reaction force is not largely attenuated, and a large vibration above 2 N in the range of about 28 Hz and 430 Hz can be generated. When the vibration generator 1 is applied to a controller (not shown) of an external device, for example, a game machine, an operator can easily sense a wide range of vibrations, which widens the scope of the game machines that can be produced.

In one embodiment, the first and second elastic members 3 and 8 and the first and second vibrators 5 and 9 are provided and the two resonance points P1 and P2 of resonance frequencies appear, but more than two elastic members (not shown) and more than two vibrators (not shown) may be provided and more than two resonance frequencies may be generated.

At least the second elastic member 8 in addition to the first elastic member 3 and at least the second vibrator 9 in addition to the first vibrator 5 may be provided, so that at least two different resonance frequencies may be generated and transmitted to the case 2 by the vibrations of at least the second vibrator 9 in addition to the first vibrator 5.

In one embodiment, when an audio signal (for example, an analog signal) is inputted into the vibration generator 1 capable of generating vibrations with a large reaction force within a wide range, music can be played through common speakers and, at the same time, melodies can be played using vibrations of frequencies corresponding to the musical scales.

Figure 3:
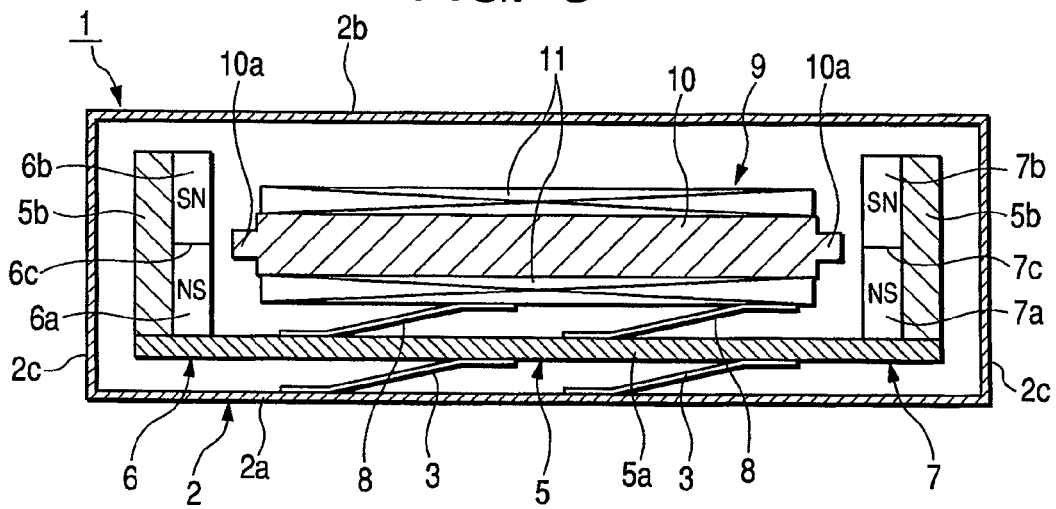
FIG. 3 is a cross-sectional view illustrating main parts of a modification of the embodiment shown in FIG. 1.

According to a first exemplary modification of the first embodiment, as shown in FIG. 3, a protrusion 10a that has a smaller cross-sectional area than the end of the core 10 and protrudes toward each of the magnets 6a and 6b, and 7a and 7b may be formed at both left and right ends of the core 10 of the second vibrator 9. By making the protrusions 10a thin, for example, with 1 mm thickness, the force attracting the second vibrator 9 (for example, magnetic spring) to the center against the elastic force of the second elastic member 8 can be decreased by the magnetic force of each magnet applied to the core 10 centered on the same line with the interfaces 6c and 7c in the initial state before electric current does not flow into the coil 11.

Figure 4:
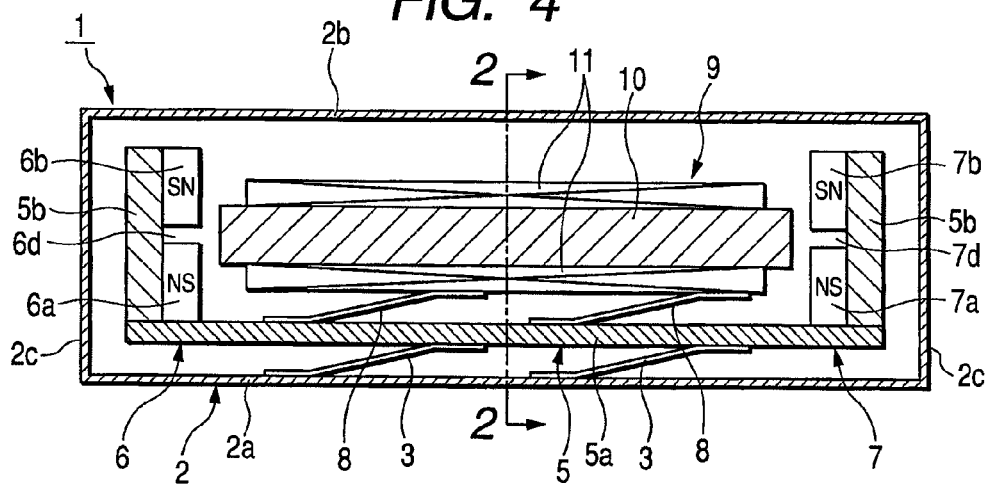
FIG. 4 is a cross-sectional view illustrating main parts of a modification of the embodiment shown in FIG. 1.

According to another exemplary modification without the magnetic spring effect, as shown in FIG. 4, recesses 6d and 7d may be formed at the interfaces of the magnets 6a and 6b, and 7a and 7b facing the ends of the core 10.

Alternatively, although not shown, non-magnetized regions (for example, neutral zone) may be formed in the vicinity of the interfaces 6c and 7c when the magnets 6a and 6b, and 7a and 7b are magnetized.

Figure 5:
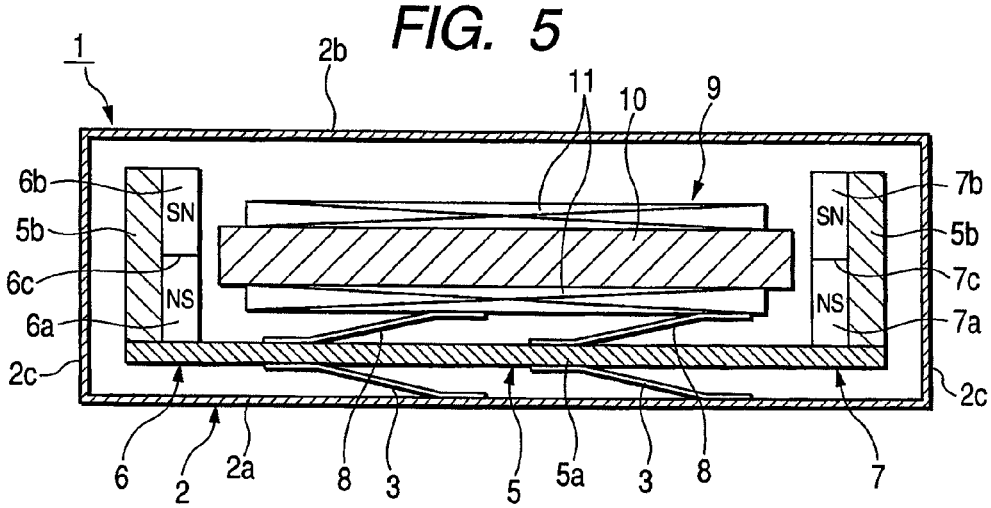
FIG. 5 is a cross-sectional view illustrating main parts of a modification of the embodiment shown in FIG. 1.

In a another exemplary embodiment, as shown in FIG. 5, one ends of the first and second elastic members 3 and 8 is respectively fixed at the same position on the upper and lower surfaces of the lower wall 5a of the first vibrator 5 to support it, and the other ends of the first elastic members 3 may be fixed and supported to the lower plate 2a of the case 2 and the other ends of the second elastic members 8 may support the second vibrator 9. For example, each end of the elastic members 3 and 8 may support the lower wall 5a of the first vibrator 5 at the same position and the other ends of each member may be bent to be away from the lower wall 5a.

According to this embodiment, the first and second elastic members 3 and 8 can be fixed at the same position as the lower wall 5a of the first vibrator 5, for example, by spot welding, and can be assembled more securely.

If the case 2 is vibrated by an external force when electric current does not flow into the coil 11, the first and second vibrators 5 and 9 separately vibrate and the first and second resonance points P1 and P2 of two resonance frequencies appear in a wide range of frequency band. A large electromotive force is induced at the coil 11 by the two strong vibrations at the first and second resonance points P1 and P2 appearing in the wide range of frequency band.

Because the vibration generator 1 of the invention can induce a large electromotive force in the wide range of frequency band, it can be used as an acceleration sensor.

For example, the vibration generator 1 can generate a large electromotive force as well as a strong vibration in a wide range of frequency band.

Figure 8:
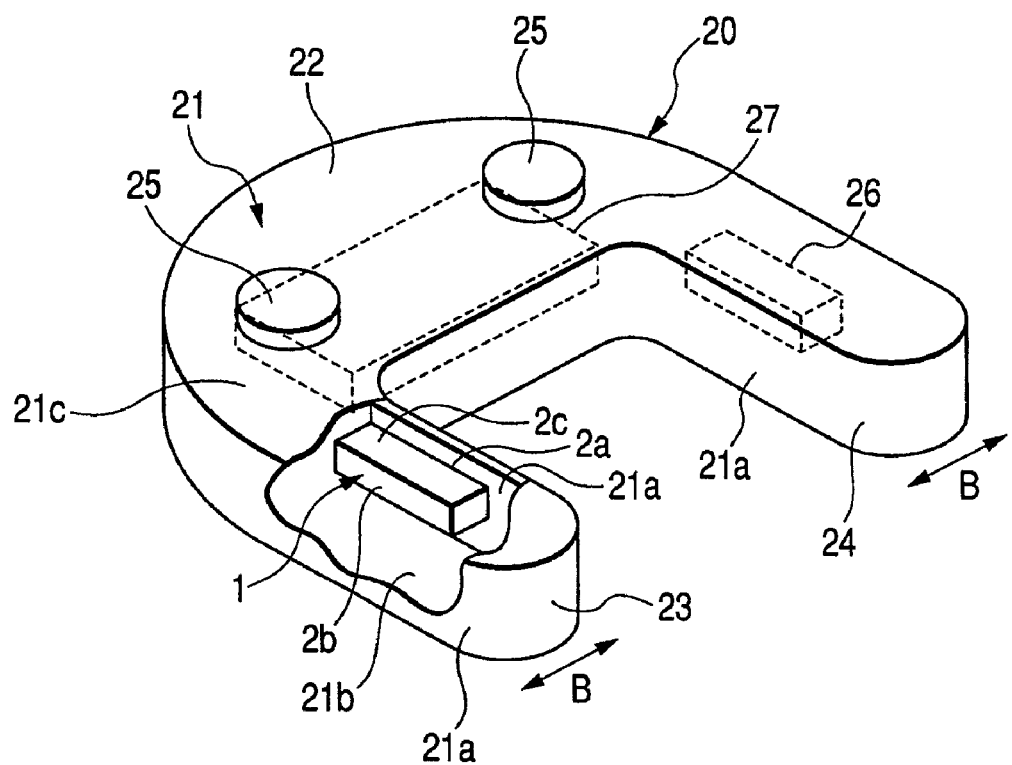
FIG. 8 is a perspective view of an input/output device of the invention.
Figure 9A:
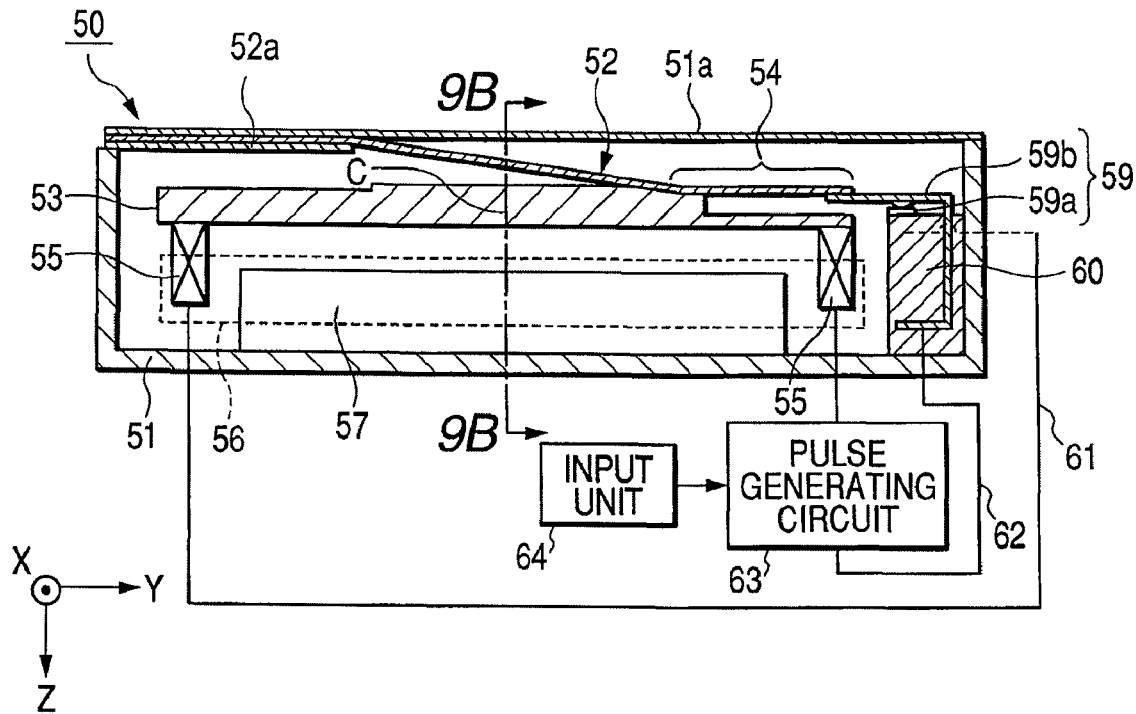
FIGS. 9A and 9B are schematic views of a known vibration generator.
Figure 9B:
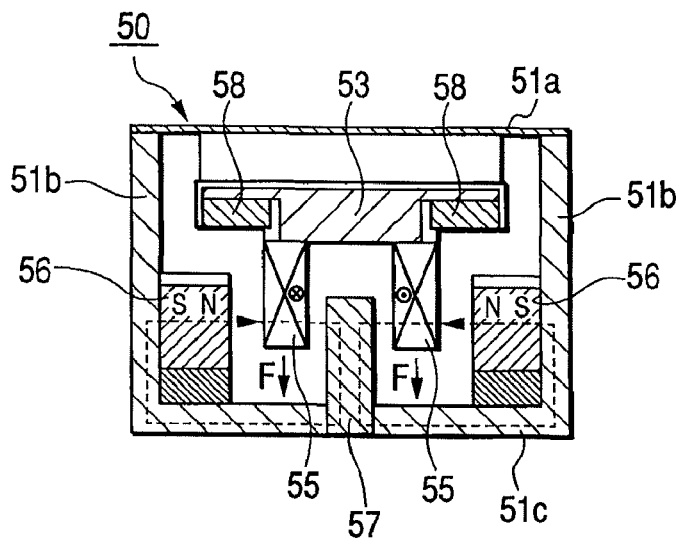

An input/output device 20 utilizing the vibration generator 1 is described hereinafter using a controller of a game machine shown in FIG. 8 by way of an example. The input/output device 20 has a case 21, which is composed of a base 22 where switches 25 (to be described below) are mounted and two grips 23 and 24 extending in one direction from the left and right side of the base 22, respectively, and an operator can hold the grips 23 and 24.

The base 22 and each of the grips 23 and 24 are formed by a peripheral wall 21a, lower wall 21b, and upper wall 21c and their insides are hollow. A pair of switches 25, which are operated by an operator with fingers, is formed on the upper wall 21c of the base 22.

The vibration generator 1 is mounted on the lower wall 21b inside the grip 23 at the left side. The lower plate 2a of the case 2 of the vibration generator 1 mounted in the grip 23 is fixed to the inside of the peripheral wall 21a, for example, by adhesives, such that the vibrators 5 and 9 vibrate toward the other grip 24 (in the direction of arrow B).

A weight having a predetermined weight is mounted in the other grip 24 and maintains the balance between the two grips 23 and 24.

In the input/output device 20, both grips 23 and 24 strongly vibrate in the direction of arrow B with two resonance frequencies generated in a wide range of frequency band due to the vibrations of the first and second vibrators 5 and 9 of the vibration generator 1 in the grip 23 in the direction of arrow B by flowing current into the coil 11.

Accordingly, both grips 23 and 24 can be strongly vibrated with one vibration generator 1 mounted in the grip 23, so that, for example, an operator who operates the game machine can sense the game, for example, a fighting game, like a reality and that he/she is in the virtual reality of the game.

In one embodiment, the vibration generator 1 is mounted in the input/output device 20 and is used as an acceleration sensor, an operator, for example, strikes the case 21 with the left hand holding the grip 24 when electric current does not flow into the coil 11, the first and second vibrators 5 and 9 vibrate and an electromotive force is induced in the coil 11.

A control unit 27 that detects the induced electromotive force is mounted in the case 21 and can output a control signal depending on the magnitude and the frequency of the detected electromotive force.

For example, if an operator holds the grip 23 with the left hand and strikes the case 21 with the right hand in the direction of arrow B when electric current does not flow into the coil 11, the control unit determines the case 21 is struck on the basis of the magnitude and the frequency of the detected electromotive force and may considerably turn up the sound of the game machine by outputting a control signal to a superior device, for example, the game machine.

Alternately, when electric current does not flow into the coil 11, the control unit may turn down the sound of the game machine by outputting a control signal corresponding to the magnitude and the frequency of the electromotive force induced when an operator slightly shakes the input/output device 20, holding the grips 23 and 24 with both hands.

Figure 6:
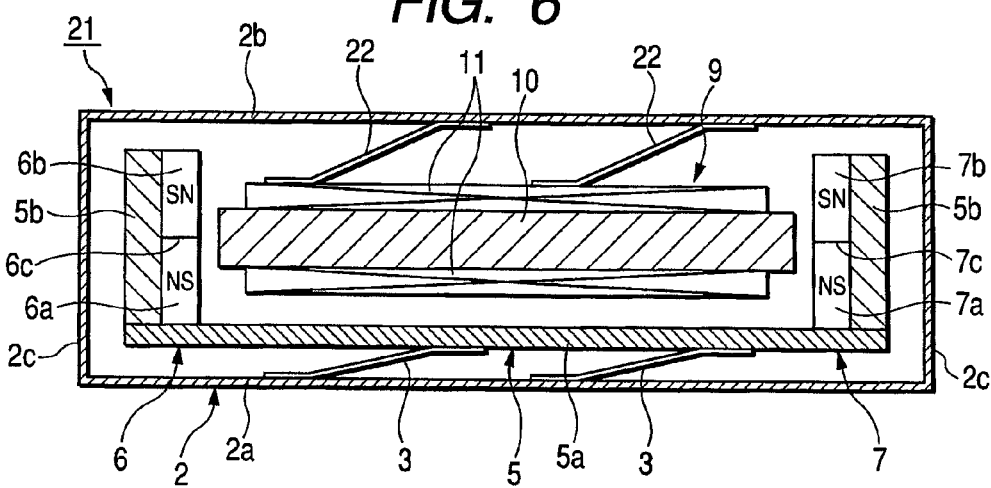
FIG. 6 is a cross-sectional view of a vibration generator according to a second exemplary embodiment.

In one embodiment, as shown in FIG. 6, a large part of the configuration of the vibration generator 1 according to the second embodiment is the same as the first embodiment except that at least the second vibrator 9 is suspended from the upper plate 2b of the case 2 through at least the second elastic members 22.

The first and second vibrators 5 and 9 are separately supported in the case 2. The resonance frequencies of the first and second vibrators 5 and 9 are reliably transmitted to the case 2.

An operator can sense at least two resonance frequencies and operate the controller more accurately. In one embodiment, the frequency characteristic in the second embodiment is the same as that appearing in FIG. 7 and a large vibration can be generated in a wide range of frequency.

In the vibration generator according to the first embodiment, the first elastic members and at least the second elastic members respectively have a constant of spring different from each other, the first vibrator and at least the second vibrator separately vibrate, so that when the first and at least the second vibrator separately vibrate, vibrations of at least two different resonance frequencies are generated and transmitted to the case. Accordingly, an operator can certainly sense the vibrations, as click vibrations, of at least two resonance frequencies transmitted to the case. Large vibrations with different frequencies from each other can be generated in a wide range including at least the two resonance frequencies.

In one embodiment, because the constant of spring of the first elastic member is larger than that of at least the second elastic members and the resonance frequency of the first vibrator is lower than that of at least the second vibrator, the vibration of the second vibrator is certainly transmitted to the case through the first elastic members.

The second vibrator has a coil wound around a bar-shaped core of magnetic material, a pair of magnets is fixed at position where the magnets respectively face both ends of the core through a predetermined space, magnetic field, which is generated in the coil when electric current flows into the coil, influences magnetic field of the magnets. The first vibrator and at least the second vibrator separately vibrate. The vibrations of the vibrators are transmitted to the case through the first elastic member and can be transmitted to an external device, for example, a game machine, including the case.

In one embodiment, the first vibrator has a lower wall of which the lower surface is supported by the first elastic members and the upper surface is supported by the second elastic members and a pair of yokes of magnetic material disposed at the end of the lower wall and facing each other. The magnets are fixed to the pair of yokes, respectively. The magnetic field of the magnets can be increased.

The magnets fixed to the first vibrator are disposed such that the different magnetic poles vertically face each other and the magnets face the ends of the core, protrusions are formed at the ends of the core to protrude toward the magnet so as to reduce the cross-sectional area of the core facing the magnet. The force attracting the core (magnetic spring), by the magnetic force of each magnet, centered on the same line with the interface of different magnetic poles in the magnets can be decreased.

In one embodiment, the magnets are disposed such that the different magnetic poles face each other, a recess is formed at the interface of the different magnetic poles, and the core is arranged such that the end thereof faces the recess. The same effect as the protrusions can be obtained.

In another embodiment, the first and second elastic members are formed of a leaf spring, one end of the first elastic member is fixed to the lower plate of the case and the other end is fixed to the lower wall of the first vibrator. One end of the second elastic member is fixed to the lower wall of the first vibrator and the other end is fixed to the second vibrator. The first and second vibrators can be certainly vibrated by flowing electric current into the coil.

The input/output device includes two grips. In one embodiment, the vibration generator is mounted in one grip, and the vibration generator is disposed such that each of the first vibrator and at least the second vibrator is capable to vibrate toward the other grip. The vibration generated at one grip can be equally transmitted to the other grip.

Accordingly, the two grips can vibrate with the same strength using one vibration generator.

In another embodiment, a weight having a predetermined weight is mounted in the other grip and maintains the balance between the grips. Therefore, weights of the two grips held by both hands are the same and an operator can equally sense the vibrations.

In one embodiment, the control unit detects the electromotive force induced in the coil when electric current does not flow into the coil and is mounted and outputs a control signal corresponding to the magnitude and the frequency of the electromotive force to be detected. The vibration generator can generate a vibration, and also appropriately controls a superior device, for example, a game machine, by outputting control signals corresponding to the magnitude and frequency of the induced electromotive force.

The vibration generator, according to one embodiment, includes a case having an upper plate and a lower plate facing each other. A first vibrator disposed at a predetermined distance from the lower plate of the case and supported by first elastic members fixed onto the lower plate. At least a second vibrator suspended at a predetermined distance from the upper plate through at least the second elastic members, in which the first elastic member and at least the second elastic member respectively have a different constant of spring and the first vibrator and at least the second vibrator separately vibrate, so that when the first vibrator and at least the second vibrator separately vibrate, vibrations having at least two resonance frequencies are generated and transmitted to the case. An operator can certainly sense the vibrations of at least the two resonance frequencies as click vibrations.

Large vibrations with a frequency different from each other can be generated in a wide range including at least the two resonance frequencies. The vibration of the first vibrator is transmitted to the case through the first elastic members and the vibration of the second vibrator is transmitted to the case through the second elastic members, so that each vibration of the first and second vibrators is separately transmitted to the case and an operator can more certainly sense the vibrations transmitted to the case as click vibrations. Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. A vibration generator comprising:
a hollow case having a lower plate;
a first vibrator disposed away from the lower plate of the case and supported by a first elastic member fixed to the lower plate; and
a second vibrator disposed away from the first vibrator and supported by second elastic member fixed to the first vibrator;
wherein the first elastic member and the second elastic member have a constant spring that is different from each other, and
wherein the first vibrator and the second vibrator are operable to vibrate separately and operable to generate and transmit at least two different resonance frequencies to the hollow case.

2. The vibration generator according to claim 1, wherein the constant of spring of the first elastic member is smaller than constant of spring of the second elastic member, and wherein the resonance frequency of the first vibrator is smaller than that of the second vibrator.

3. The vibration generator according to claim 1, wherein the second vibrator has a bar-shaped core of magnetic material and a coil wound around the core, magnets face both ends of the core through a predetermined space,
wherein a magnetic field, which is generated in the coil when electric current flows into the coil, influences the magnetic field of the magnets, and
wherein the first vibrator and the second vibrator separately vibrate, and the first and second vibrators are operable to transmit the vibration to the case through the first elastic members.

4. The vibration generator according to claim 3, wherein a lower surface of the first vibrator is supported by the first elastic members and the upper surface is supported by the second elastic members and a pair of yokes of magnetic material disposed at the end of the lower wall and face each other, the magnets are fixed to the pair of yokes.

5. The vibration generator according to claim 3, wherein the magnets fixed to the first vibrator are disposed such that the different magnetic poles vertically face each other and the magnets face the ends of the core, protrusions are formed at the ends of the core to protrude toward the magnets so as to reduce the cross-sectional area of the core that faces the magnets.

6. The vibration generator according to claim 3, wherein the magnets are disposed such that the different magnetic poles face each other, a recess is formed at the interface of the different magnetic poles, and the core is arranged such that the end thereof faces the recess.

7. The vibration generator according to claim 3, wherein the first and second elastic members are formed of a leaf spring, one end of the first elastic member is fixed to the lower plate of the case and the other end is fixed to a lower surface of the lower wall of the first vibrator, and one end of the second elastic member is fixed to an upper surface of the lower wall of the first vibrator and the other end is fixed to the second vibrator.

8. The vibration generator according to claim 3, further comprising:
a control unit that detects the electromotive force induced in the coil when electric current does not flow into the coil;
wherein the control unit outputs a control signal corresponding to the magnitude and the frequency of the electromotive force to be detected.

9. The vibration generator according to claim 8, wherein at least the second vibrator has a coil wound around a bar-shaped core of magnetic material, a pair of magnets is fixed at positions where the magnets face both ends of the case at a predetermined space, wherein a magnetic field, which is generated in the coil when electric current flows into the coil and influences magnetic field of the magnets, wherein the first vibrator and at least the second vibrator are operable to vibrate separately, and wherein the vibration of the first vibrator is transmitted to the case through the first elastic members and the vibration of at least the second vibrator is also transmitted to the case.

* * * * *